US007755615B2

(12) United States Patent
Foo et al.

(10) Patent No.: US 7,755,615 B2
(45) Date of Patent: Jul. 13, 2010

(54) OPTICAL SHUTTERED TOUCHSCREEN AND METHOD THEREFOR

(75) Inventors: Ken K Foo, Gurnee, IL (US); John W Kaehler, Lake Bluff, IL (US); Pinky Yu, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 876 days.

(21) Appl. No.: 11/611,970

(22) Filed: Dec. 18, 2006

(65) Prior Publication Data

US 2008/0143689 A1 Jun. 19, 2008

(51) Int. Cl.
*G06F 3/041* (2006.01)

(52) U.S. Cl. .................................... 345/173; 345/174

(58) Field of Classification Search ................. 345/173
See application file for complete search history.

(56) References Cited

U.S. PATENT DOCUMENTS 5,606,346 A 2/1997 Kai et al.
5,777,596 A * 7/1998 Herbert ...................... 345/173
5,894,304 A 4/1999 Hirano
6,788,282 B2 9/2004 Ito
6,822,640 B2 * 11/2004 Derocher .................... 345/173
6,842,170 B1 * 1/2005 Akins et al. ................. 345/173
6,940,484 B2 9/2005 Yatabe
7,545,343 B2 * 6/2009 Ogino et al. ................ 345/173
2003/0551927 3/2003 Inamori
2005/0122284 A1 6/2005 Gates et al.
2005/0162410 A1 * 7/2005 Johnson et al. ............. 345/174
2005/0162411 A1 * 7/2005 Berkel van .................. 345/179
2005/0280635 A1 * 12/2005 Hinata ........................ 345/173

FOREIGN PATENT DOCUMENTS

EP 0802476 A2 10/1997
GB 2348039 9/2000

OTHER PUBLICATIONS

International Search Report PCT/US2007/074916 dated Jun. 11, 2008.

* cited by examiner

*Primary Examiner*—Richard Hjerpe
*Assistant Examiner*—Dorothy Webb
(74) *Attorney, Agent, or Firm*—Ingrassia, Fisher & Lorenz, P.C.; Sylvia Chen

(57) ABSTRACT

A touchscreen display system (418) is provided which includes a touchscreen (420), a touchscreen input detector (422), a capacitive sensor driver (423), and a display driver (424). The touchscreen input detector (422) is coupled to a first layer (504) of the touchscreen (420) and determines a touchscreen (420) input in response to sensing tactile inputs during a sensing time interval (610). The display driver (424) is coupled to a second layer (506) of the touchscreen (420) and provides a drive voltage (606, 608) at a first voltage level to the plurality of optical shutter segments (508) during a first portion (620) of the sensing time interval (610) and maintains the drive voltage (606, 608) at substantially zero volts during a second portion (622) of the sensing time interval (610), the second portion (622) being greater than half of the sensing time interval (610).

19 Claims, 4 Drawing Sheets

OPTICAL SHUTTERED TOUCHSCREEN AND METHOD THEREFOR

FIELD OF THE DISCLOSURE

The present invention generally relates to touchscreens and display drivers, and more particularly relates to optical shuttered touchscreens and their operation.

BACKGROUND OF THE DISCLOSURE

In many portable electronic devices, such as mobile communication devices, displays present information to a user. For example, polymer-dispersed liquid crystal (PDLC) display technology can display video and text information and, utilizing twisted nematic (TN) polymer segments, can also provide an optical shutter operation. Optical shuttering is sometimes used to present information to a user and is particularly adapted to touchscreen operation where the information represents control icons (e.g., forward, reverse, pause, and play control symbols for video operation). TN/PDLC displays typically include an electroluminescent (EL) backlight for operation in both high and low ambient light conditions.

While providing modular optical shuttering operation by selectively driving the TN segment electrodes, operation of the EL backlight and selective driving of the TN segment electrodes disadvantageously creates an electrically noisy environment for sensing touchscreen inputs, thereby hampering touchscreen operation. Conventionally, an indium-tin oxide (ITO) ground plane is provided below the TN segment electrodes and above the EL backlight to control the electrical noise and improve the touchscreen operation. However, addition of the ITO ground plane increases the thickness of the display and the cost and complexity of the display manufacture. In addition, the ITO ground plane connection is susceptible to failure, thereby reducing display yield and/or increasing field failure defects. Also, the ITO ground plane is not fully transmissive, thereby reducing the brightness and effectiveness of the EL backlight.

Thus, there is an opportunity to eliminate an ITO ground plane from a TN/PDLC touchscreen. Furthermore, other desirable features and characteristics of the present invention will become apparent from the subsequent detailed description of the invention and the appended claims, taken in conjunction with the accompanying drawings and this background of the disclosure.

BRIEF DESCRIPTION OF THE DRAWINGS

The present invention will hereinafter be described in conjunction with the following drawing figures, wherein like numerals denote like elements.

DETAILED DESCRIPTION

A method determines touchscreen inputs in response to sensing tactile inputs on a face of the touchscreen while optically shuttering the touchscreen. The method includes the steps of charging a capacitive sensor layer of the touchscreen while providing a drive voltage at a first voltage level to a plurality of optical shutter segments in the display during a first time interval and sensing a charge fluctuation on the capacitive sensor layer while maintaining the drive voltage at substantially zero volts during a second time interval. The first and second time intervals combine to form a sensing time interval for sensing touchscreen inputs, and the second time interval is greater than half of the complete sensing time interval.

A touchscreen system includes a display, a touchscreen input detector, and a display driver. The display includes a first layer for sensing tactile inputs on a face of the display and a second layer having a plurality of optical shutter segments. The touchscreen input detector is coupled to the first layer of the display and determines a touchscreen input in response to capacitively sensing the tactile inputs for a sensing time interval. And the display driver is coupled to the second layer of the display and provides a drive voltage at a first voltage level to the plurality of optical shutter segments during a first portion of the sensing time interval and maintains the drive voltage at a second voltage level during a second portion of the sensing time interval. The second voltage level is substantially zero volts, and the first portion appended by the second portion is substantially the sensing time interval. In addition, the second portion is greater than half of the sensing time interval.

The following detailed description is merely exemplary in nature and is not intended to limit the invention or the application and uses of the invention. Furthermore, there is no intention to be bound by any theory presented in the preceding background of the disclosure or the following detailed description.

Figure 1:
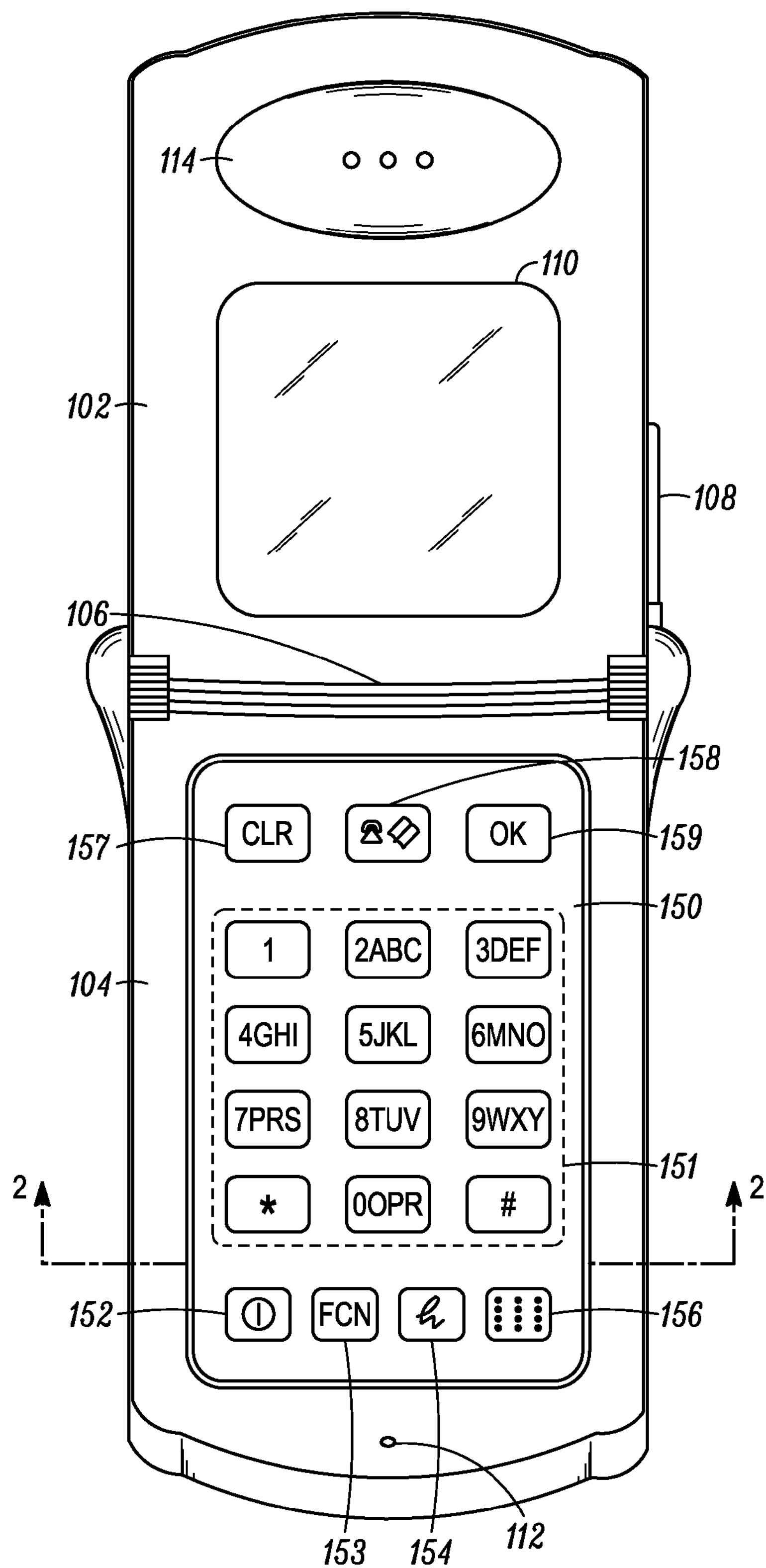
FIG. 1 depicts a mobile communication device having an optically shuttered touchscreen in accordance with an embodiment of the present invention.

FIG. 1 shows a mobile communication device 100 implementing a touchscreen with aligned optical shutter and backlight cells in accordance with an embodiment of the present invention. While the electronic device shown is a mobile communication device 100, such as a flip-style cellular telephone, the touchscreen with aligned optical shutter and backlight cells can also be implemented in cellular telephones with other housing styles, personal digital assistants, television remote controls, video cassette players, household appliances, automobile dashboards, billboards, point-of-sale displays, landline telephones, and other electronic devices.

The mobile communication device 100 has a first housing 102 and a second housing 104 movably connected by a hinge 106. The first housing 102 and the second housing 104 pivot between an open position and a closed position. An antenna 108 transmits and receives radio frequency (RF) signals for communicating with a complementary communication device such as a cellular base station. A display 110 positioned on the first housing 102 can be used for functions such as displaying names, telephone numbers, transmitted and received information, user interface commands, scrolled menus, and other information. A microphone 112 receives sound for transmission, and an audio speaker 114 transmits audio signals to a user.

A keyless input device 150 is carried by the second housing 104. The keyless input device 150 is implemented as a touchscreen with a display. A main image 151 represents a standard, twelve-key telephone keypad. Along the bottom of the keyless input device 150, images 152, 153, 154, 156 represent an on/off button, a function button, a handwriting recognition mode button, and a telephone mode button. Along the top of the keyless input device 150, images 157, 158, 159 represent a "clear" button, a phonebook mode button, and an "OK" button. Additional or different images, buttons or icons representing modes, and command buttons can be implemented using the keyless input device. Each image 151, 152, 153, 154, 156, 157, 158, 159 is a direct driven pixel, and this keyless input device uses a display with aligned optical shutter and backlight cells to selectively reveal one or more images and provide contrast for the revealed images in both low-light and bright-light conditions.

Figure 2:
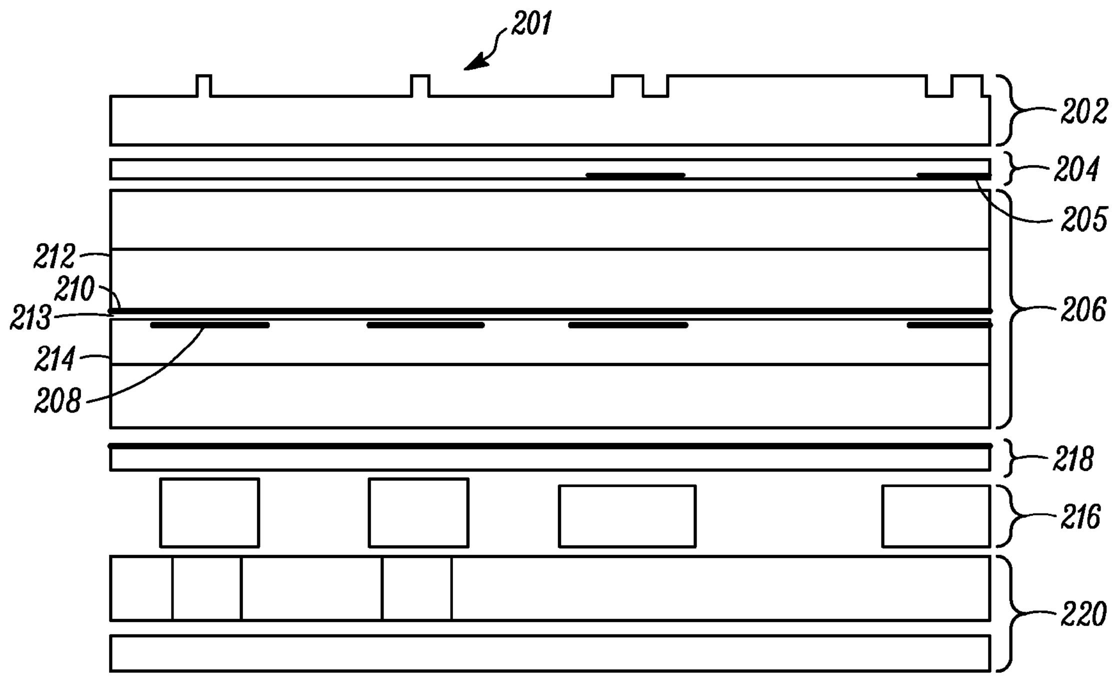
FIG. 2 is a cross-sectional diagram of a conventional TN/PDLC touchscreen.

Referring to FIG. 2, a cross section of a conventional touchscreen 200 is depicted with aligned optical shutter and backlight cells and is usable for the keyless input device 150 with the cross-section being a portion of a view taken along line 2-2 of FIG. 1. The conventional display 200 is a stack with a user-viewable and user-accessible face 201 and multiple layers below the face 201, including a graphic coverlay layer 202 and a capacitive sensor layer 204 with an indium-tin oxide (ITO) electrode 205. The graphic coverlay 202 provides an upper layer viewable to and touchable by a user and may provide some glare reduction. The capacitive sensor layer 204 senses touchscreen inputs on the graphic coverlay layer 202 of the display 200. Beneath the capacitive sensor layer 204 is a twisted nematic (TN) stack layer 206 including a TN backplane electrode 210 and TN segment electrodes 208 between two substrates 212, 214 for providing the optical shutter operation of the display 200. The TN backplane electrode 210 and TN segment electrodes 208 are formed of indium-tin oxide (ITO) material to provide both transparency and electrical conductivity for operation of the TN stack. Also, while the TN backplane electrode 210 is depicted above the TN segment electrodes 208, a TN stack layer 206 having the TN backplane electrode 210 below the TN segment electrodes 208 would function similarly.

The TN stack layer 206 utilizes, for example, twisted nematic (TN) liquid crystal (TNLC) display technology employing TN optical shutter material in an optical shutter layer 213 and the TN segment electrodes 208 to provide optical shutter operation. While TNLC technology is described herein for the optical shuttering operation, the optical shutter layer 213, sandwiched between the TN backplane electrodes 210 and the TN polymer segment electrodes 208, can alternatively be made using nematic liquid crystal technology (such as twisted nematic or super twisted nematic liquid crystals), polymer-dispersed liquid crystal technology (PDLC), ferroelectric liquid crystal technology, electrically-controlled birefringent technology, optically-compensated bend mode technology, guest-host technology, and other types of light modulating techniques which use optical shutter material 213 such as TN polymer material, PDLC material, cholesteric material, or electro-optical material. The electric field created by the electrodes 208, 210 alter the light transmission properties of the TNLC optical shutter material 213, and the pattern of the TN segment electrode layer 208 defines pixels of the display. These pixels lay over the images 151, 152, 153, 154, 156, 157, 158, 159 shown in FIG. 1. In the absence of the electric field, the liquid crystal material and dichroic dye in the TNLC material 213 are randomly aligned and absorb most incident light. In the presence of the electric field, the liquid crystal material and dichroic dye align in the direction of the applied field and transmit substantial amounts of incident light. In this manner, a pixel of the TNLC cell can be switched from a relatively non-transparent state to a relatively transparent state. Each pixel can be independently controlled to be closed-shuttered or open-shuttered, depending on the application of an electric field, and the pixels act as "windows" with optical shutters that can be opened or closed, to reveal images underneath (e.g. images 151, 152, 153, 154, 156, 157, 158, 159).

Beneath the TN stack layer 206 is an electroluminescent (EL) stack layer 216 separated from the TN stack layer 206 by an ITO ground layer 218. The EL stack layer 216 includes a backplane and electrodes which provide backlight for operation of the display 200 in both ambient light and low light conditions by alternately applying a high voltage level, such as one hundred volts, to the backplane and electrode. The ITO ground layer 218 is coupled to ground and provides an ITO ground plane 218 for reducing the effect on the capacitive sensor layer 204 of any electrical noise generated by the operation of the EL stack layer 216 or other lower layers within the display 200. Beneath the EL stack layer 216 is a base layer 220 which may include one or more layers such as a force sensing switch layer and/or a flex base layer. The various layers 202, 204, 206, 218, 216 and 220 are adhered together by adhesive layers applied therebetween.

Figure 3:
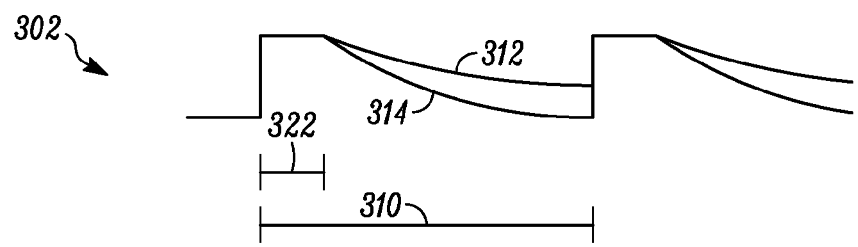
FIG. 3 is a timing diagram for a display driver and a capacitive sensor operating the touchscreen of FIG. 2 in a conventional manner.
Figure 3:
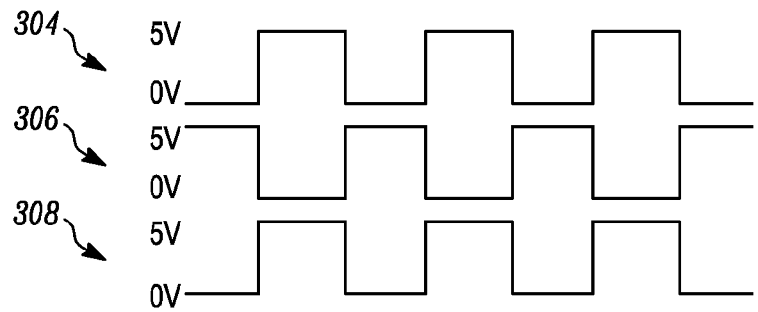

Conventional operation of the display 200 is illustrated in FIG. 3, wherein the charge 302 from the capacitive sensor layer 204, the voltage 304 of the TN backplane 210 and the voltages 306, 308 of first and second portions of the TN segment electrodes 208 are depicted. To perform capacitive sensing during a period 310, a charging voltage is provided to the ITO electrode 205 of the capacitive sensor layer 204 for a first portion 322 of the period 3 10. After the charging voltage is removed from the electrode 205, the charge 302 has two different decay profiles 312, 314 depending on whether a user's touch is detected on the display 200. In an electrically noisy environment, the signal-to-noise ratio (SNR) of the capacitive sensing (i.e., of the voltage of the detectable charge), where the charge is the multiple of the capacitance (determined from a distance of user's finger from the face 201) times the voltage thereof, is small, thereby complicating detection of touchscreen inputs. The ITO ground plane layer 218 provides some isolation between the high voltage EL backlight layer 216 and the low voltage TN stack layer 206, thereby increasing the SNR of the capacitive sensing.

During the same time period 310, the voltages 304, 306, 308 supplied to the TN backplane 210 and the TN segment electrodes 208 are switched between a positive voltage, typically about five volts, and zero volts. The voltage 306 of the portion of the TN segment electrodes 208 that are turned "on" to render corresponding portions of the display 200 over such portion of the TN segment electrodes 208 relatively transparent are switched opposite to the voltage 304 of the TN backplane 210 (i.e., when the voltage 304 of the TN backplane is high, the voltage 306 of the "on" portion of the TN segment electrodes 208 is low). Conversely, the voltage 308 of the portion of the TN segment electrodes 208 that are turned "off" optically shutter corresponding portions of the display 200 over such portion of the TN segment electrodes 208 because their voltage is switched in the same manner as the voltage 304 of the TN backplane 210. It can be seen from FIG. 3 that during period 310, the voltages 306, 308 supplied to the TN segment electrodes 208 and the TN backplane 210 are high approximately fifty per cent of the time period 310.

Figure 4:
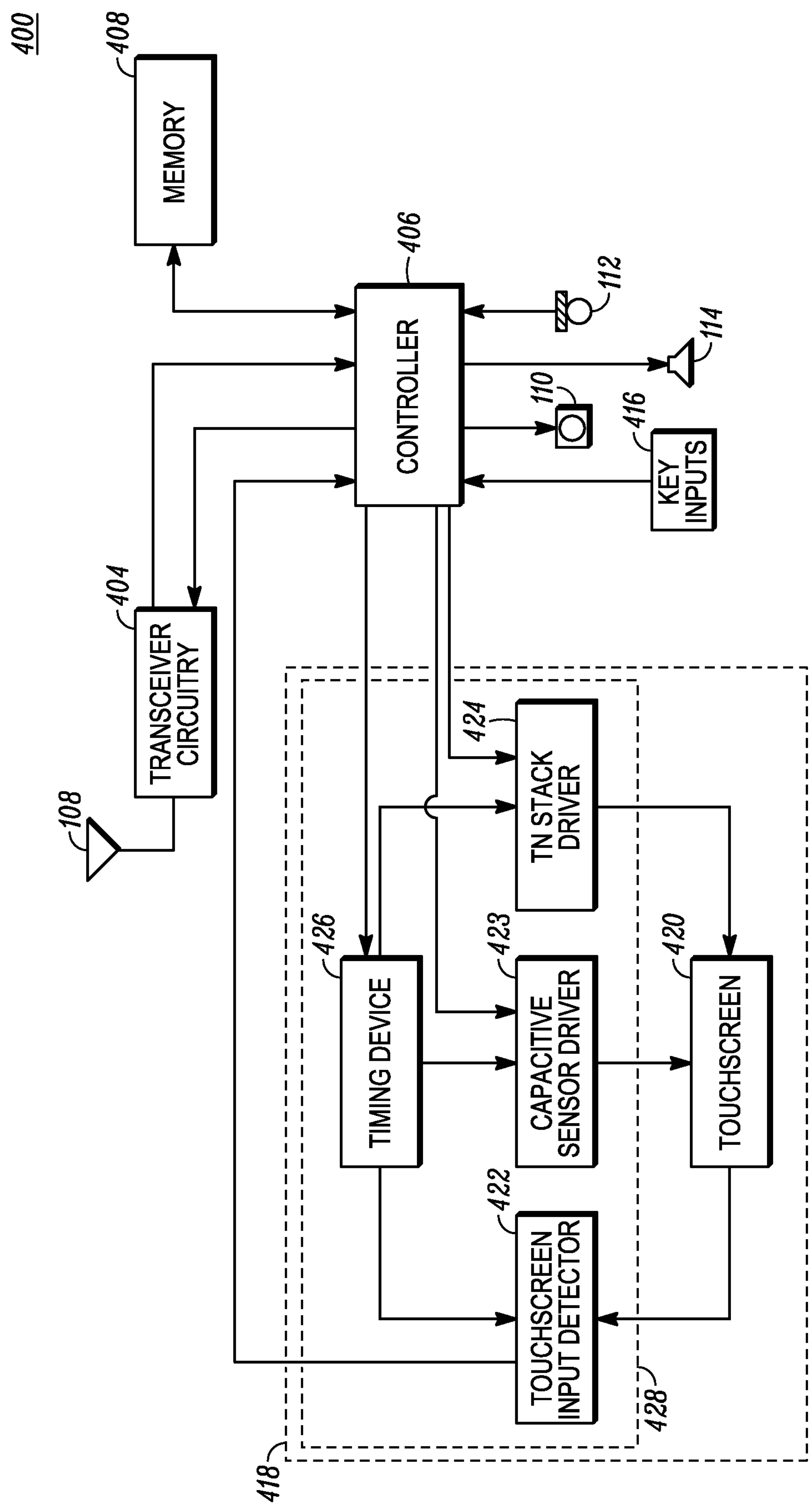
FIG. 4 is a block diagram of an electronic device in accordance with an embodiment of the present invention.

FIG. 4 depicts a block diagram of an electronic device 400, such as the mobile communication device 100 of FIG. 1, in accordance with an embodiment of the present invention.

Although the electronic device 400 is depicted as a cellular telephone, the electronic device can be implemented as any wired or wireless electronic device utilizing a touchscreen display user interface such as a pager, a computer, a personal digital assistant, an equipment control device, or the like.

In this embodiment, the electronic device 400 includes the antenna 108 for receiving and transmitting radio frequency (RF) signals. The antenna 108 is coupled to transceiver circuitry 404 in a manner familiar to those skilled in the art. The transceiver circuitry 404 includes receiver circuitry and transmitter circuitry. The receiver circuitry demodulates and decodes received RF signals to derive information therefrom and is coupled to a controller 406 and provides the decoded information to the controller 406 for utilization by the controller 406 in accordance with the function(s) of the electronic device 400. The controller 406 also provides information to the transmitter circuitry of the transceiver circuitry 404 for encoding and modulating the information into RF signals for transmission from the antenna 108.

As is well-known in the art, the controller 406 is coupled to a memory 408 which stores data and operational information for use by the controller 406 to perform the functions of the electronic device 400. The controller 406 is also coupled to conventional user interface devices such as any or all of: a microphone 112, a speaker 114, a display 110, and/or functional key inputs 416.

In accordance with an embodiment of the present invention, the electronic device 400 also includes a touchscreen display system 418 including a touchscreen 420, a touchscreen input detector 422, a capacitive sensor driver 423, a TN stack driver 424, and a timing device 426. The touchscreen 420 enables the keyless input device 150 (FIG. 1). The controller 406 provides control signals to the capacitive sensor driver 423 which, in response to the control signals, provides charging voltages to a capacitive sensor layer of the touchscreen 420 for operation. In addition, the controller 406 provides control signals to the TN stack driver 424 which, in response to the control signals, provides drive voltages to a TN stack layer of the touchscreen 420 for optical shuttering operation. The controller 406 provides additional signals to the touchscreen 420 for other functions such as controlling voltages for operation of a backlight layer of the touchscreen 420. The touchscreen input detector 422 is coupled to the touchscreen 420 for detecting the charge from the capacitive sensing layer thereof and translating the detected charges into user input signals for providing to the controller 406. The timing device 426 is coupled to the touchscreen input detector 422, the capacitive sensor driver 423, and the TN stack display driver 424 for control of their operation in accordance with an embodiment of the present invention.

The timing device 426, the capacitive sensor driver 423, and the TN stack driver 424 are typically implemented as separate elements. In accordance with one aspect of the present invention, however, the synergy of the three elements and the ability to coordinate the timing of control signals provided to the capacitive sensing layer 504, the TN backplane 510, and the TN segment electrodes 508 (as will be described in accordance with FIGS. 5 and 6) can be utilized to incorporate all three elements into a single semiconductor device for advantageously simplifying manufacture of the touchscreen display system 418 and/or of the electronic device 400. Alternatively, as depicted in FIG. 4, the timing device 426, the touchscreen input detector 422, the capacitive sensor driver 423, and the TN stack driver 424 can be implemented as a single semiconductor device 428. The synergy of these four elements and the ability to coordinate the detection of charge within the capacitive sensing layer 504 with the timing of control signals provided to the capacitive sensing layer 504, the TN backplane 510, and the TN segment electrodes 508 and the detection of charge within the capacitive sensing layer 504 further simplifies manufacture of the touchscreen display system 418 and/or of the electronic device 400.

Figure 5:
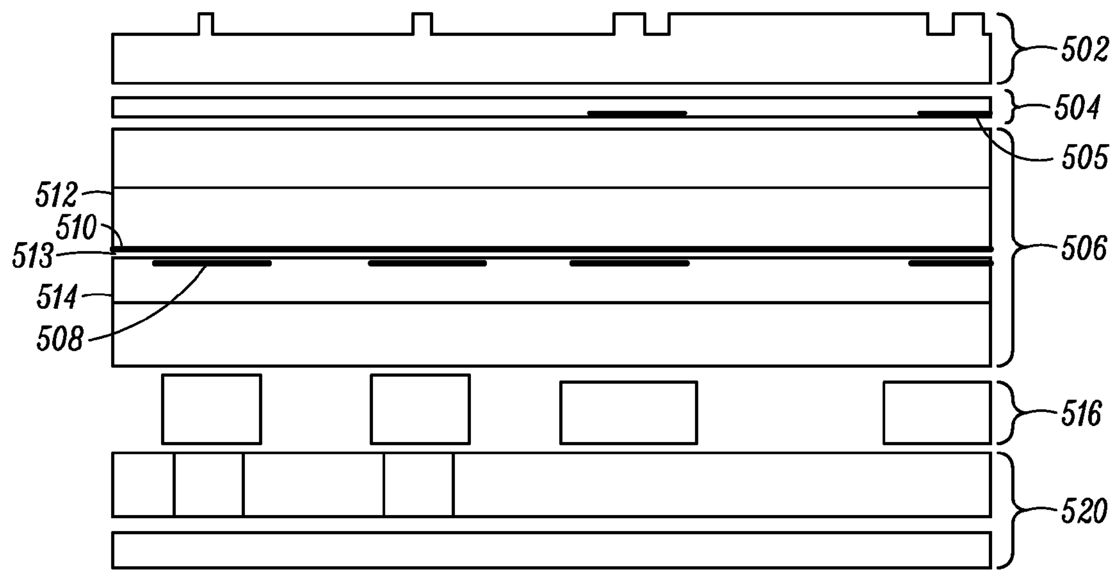
FIG. 5 is a cross sectional diagram of an optically shuttered touchscreen for use in the electronic device of FIG. 4 in accordance with an embodiment of the present invention.

Referring to FIG. 5, a cross-sectional view of the touchscreen 420 in accordance with an embodiment of the present invention includes a graphic coverlay layer 502, a capacitive sensor layer 504 with ITO electrode 505, a TN stack layer 506, an electroluminescent (EL) stack layer 516 and a base layer 520 (which may include one or more layers such as a force sensing switch layer and/or a flex base layer) adhered together by adhesive layers applied therebetween. The TN stack layer 506 includes two substrates 512, 514 supporting a TN backplane electrode 510 and TN segment electrodes 508 with TN shutter material 513 sandwiched therebetween. In accordance with an embodiment of the present invention, the TN shutter material 513 is formulated to have a fast response (or rise) time and a slow decay time such that, in response to application of an electric field to the TN shutter material 513, liquid crystal material and dichroic dye in the TN shutter material 513 quickly aligns in the direction of the applied field to transmit substantial amounts of incident light while, in response to removal of the electric field, the TN shutter material 213 slowly decays to its noncharged state where the liquid crystal material and the dichroic dye in the TN shutter material 513 randomly align, thereby absorbing most incident light.

Operation of the touchscreen 420 in accordance with an embodiment of the present invention allows removal of the ITO ground plane layer 218 shown in FIG. 2, thereby reducing both the thickness of the touchscreen 420 and the cost of its manufacture (e.g., one less process step as well as fewer layers of material and adhesive). In addition, since the ITO layer 218 is not fully light-transmissive (i.e., not fully transparent), removal of the ITO layer 218 allows more light from the electroluminescent layer 516 to pass through the optical shuttering TN stack layer 506 and thence to the user, providing sharper and better-defined images 151, 152, 153, 154, 156, 157, 158, 159 (FIG. 1).

Figure 6:
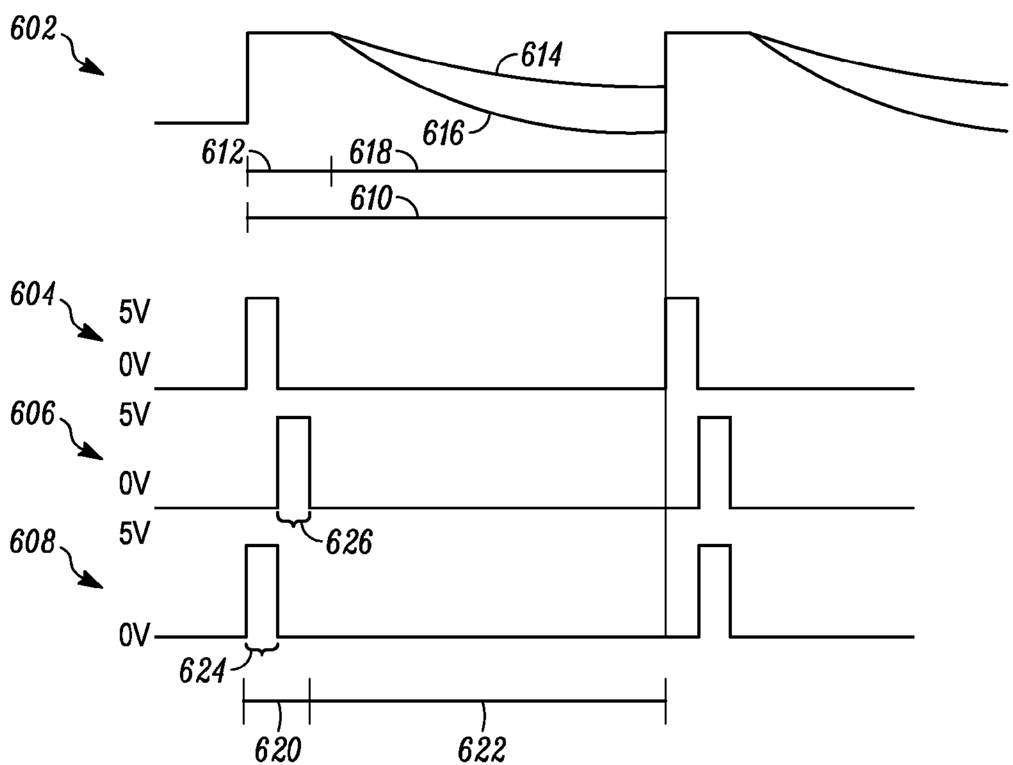
FIG. 6 is a timing diagram for the display driver and the capacitive sensor of the electronic device of FIG. 4 in accordance with an embodiment of the present invention.

FIG. 6 illustrates the enhanced operation of the touchscreen 420 in accordance with an embodiment of the present invention. The charge 602 from the ITO electrode 505 of the capacitive sensor layer 504, the voltage 604 of the TN backplane 510, and the voltages 606, 608 of first and second portions of the TN segment electrodes 508 are depicted. Capacitive sensing during a sensing time interval 610 is performed similarly to conventional operation as described above in accordance with FIG. 3. Thus, a charging voltage is provided to the ITO electrode 505 of the capacitive sensor layer 504 for a charging portion 612 of the time interval 610. After the charging voltage is removed from the electrode 505, the charge 602 has two different decay profiles 614, 616 during a decay period 618 of the time interval 610 depending on whether a user touches the touchscreen 420.

During the sensing time interval 610, the voltages 604, 606, 608 supplied to the TN backplane 510 and the TN segment electrodes 508 are switched between a positive voltage, typically about five volts, and zero volts. In accordance with an embodiment of the present invention, the drive voltages 606, 608 are provided at a first voltage level of approximately five volts to a predetermined portion of the TN segment electrodes 508 and a remaining portion of the TN segment electrodes 508, respectively, during a first portion 620 of the sensing time interval 610 and maintained at substantially zero volts during a second portion 622 of the sensing time interval. Provision of the TN shutter material 513 in accordance with an embodiment of the present invention, whereby the TN shutter material 513 has a quick response time and a slow decay time, advantageously allows for the second portion 622 to be greater than half of the sensing time interval 610 and can be about eighty per cent of the sensing time interval 610.

To provide optical shuttering, the drive voltages 604, 608 are provided at approximately five volts to the TN backplane 510 and the predetermined portion of the TN segment electrodes 508 for a first subportion 624 of the first portion 620 of the sensing time interval 610 while the voltage 606 of the remaining portion of the TN segment electrodes 508 is maintained at approximately zero volts. During a second subportion 626, the drive voltage 606 of the remaining portion of the TN segment electrodes 508 is provided at approximately five volts, while the voltages 604, 608 of the TN backplane 510 and the predetermined portion of the TN segment electrodes 508 is switched to approximately zero volts. In this manner, the predetermined portion of the TN segment electrodes 508 are "off" 610 and the remaining portion of the TN segment electrodes 508 are "on" during the sensing time interval 610. A simple variation is to predetermine the "on" TN segment electrodes and reverse the timing of the applied voltages.

Operation in accordance with an embodiment allows optical shuttering operation with drive voltages 604, 606, 608 provided only during the first portion 612 of the sensing time interval 610 while a drive voltage 602 is also being provided to the capacitive sensor layer 504 simultaneously during a charging portion 612 of the sensing time interval 610. Thus, the semiconductor device 428 can be utilized for providing the voltages to generate the charge 602 as well as the voltages 604, 606, 608. In addition, the drive voltages 604, 606, 608 provided to the TN backplane 510 and the TN segment electrodes 508 are maintained near zero volts throughout the second portion 622 of the sensing time interval 610 which coincides with the decay period 618 thereby decreasing electrical noise during the decay period 618 and increasing the SNR of the measured charge 602 during the crucial time that the decay curve profiles 614 or 616 are being detected by the touchscreen input detector 422. The timing device 426 is configured to provide timing for the TN stack driver 424 to provide the drive voltages 604, 606, 608 and for the capacitive sensor driver 423 to provide the charge to the ITO electrode 505 of the capacitive sensor layer 504 in accordance with an embodiment of the present invention as well as providing timing for the touchscreen input detector 422 to detect the decay curve profile 614, 616 during the decay period 618.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A touchscreen display system comprising:

a touchscreen with a first layer for sensing tactile inputs on a face of the touchscreen and a second layer having a plurality of optical shutter segments;

a touchscreen input detector coupled to the first layer and determining a touchscreen input in response to sensing the tactile inputs for a sensing time interval; and a driver coupled to the second layer and providing a drive voltage at a first voltage level to the plurality of optical shutter segments during a first portion of the sensing time interval and maintaining the drive voltage at a second voltage level during a second portion of the sensing time interval, wherein the second voltage level is substantially zero volts, and wherein the first portion appended by the second portion is substantially the sensing time interval, the second portion being greater than half of the sensing time interval.

2. The touchscreen display system in accordance with claim 1 wherein the plurality of optical shutter segments are segments from a group comprising: twisted nematic (TN) segments, polymer-dispersed liquid crystal (PDLC) segments, cholesteric segments, and electro-optical segments.

3. The touchscreen display system in accordance with claim 1 wherein the touchscreen includes an electroluminescent backlight.

4. The touchscreen display system in accordance with claim 1 wherein the driver optically shutters the touchscreen by providing the drive voltage to a predetermined portion of the plurality of optical shutter segments during a first subportion of the first portion and providing the drive voltage to a remaining portion of the plurality of optical shutter segments during a remaining subportion of the first portion, wherein the predetermined portion of the plurality of optical shutter segments are "off" during the sensing time interval and the remaining portion of the plurality of optical shutter segments are "on" during the sensing time interval.

5. The touchscreen display system in accordance with claim 4 wherein the second layer includes an optical shutter backplane, and wherein the driver is coupled to the optical shutter backplane and provides the drive voltage thereto during the first subportion.

6. The touchscreen display system in accordance with claim 4 wherein the driver maintains the remaining portion of the plurality of optical shutter segments near zero volts during the first subportion and maintains the predetermined portion of the plurality of optical shutter segments near zero volts during the remaining subportion.

7. The touchscreen display system in accordance with claim 1 wherein the first layer includes a capacitive sensor.

8. The touchscreen display system in accordance with claim 7 wherein the touchscreen input detector determines the touchscreen input in response to sensing a decay profile of a charge on the capacitive sensor during the second portion of the sensing time interval.

9. A method for determining touchscreen inputs in response to sensing tactile inputs on a face of a touchscreen with a plurality of optical shutter segments while optically shuttering the touchscreen, the method comprising:

charging a capacitive sensor layer of the touchscreen while providing a drive voltage at a first voltage level to the plurality of optical shutter segments during a first time interval; and sensing a charge fluctuation on the capacitive sensor layer while maintaining the drive voltage at a second voltage level of substantially zero volts during a second time interval, wherein the first time interval and the second time interval combine to form a sensing time interval for sensing touchscreen inputs, the second time interval being greater than half of the sensing time interval.

10. The method in accordance with claim 9 wherein the first voltage level is approximately five volts.

11. The method in accordance with claim 9 wherein the second time interval of the sensing time interval is approximately eighty percent of the sensing time interval.

12. The method in accordance with claim 9 wherein charging a capacitive sensor layer while providing a drive voltage to the plurality of optical shutter segments comprises:

providing the drive voltage to a predetermined portion of the plurality of optical shutter segments during a first subportion of the first time interval; and providing the drive voltage to a remaining portion of the plurality of optical shutter segments during a remaining subportion of the first time interval, wherein the predetermined portion of the plurality of optical shutter segments are "off" during the sensing time interval and the remaining portion of the plurality of optical shutter segments are "on" during the sensing time interval.

13. The method in accordance with claim 12 wherein the touchscreen includes an optical shutter backplane layer, and wherein providing the drive voltage to a predetermined portion of the plurality of optical shutter segments during the first subportion of the first time interval comprises:

providing the drive voltage to the predetermined portion of the plurality of optical shutter segments and to the optical shutter backplane layer during the first subportion of the first time interval.

14. The method in accordance with claim 12 wherein providing the drive voltage to a predetermined portion of the plurality of optical shutter segments during the first subportion of the first time interval comprises:

maintaining the remaining portion of the plurality of optical shutter segments near zero volts during the first subportion of the first time interval.

15. The method in accordance with claim 12 wherein providing the drive voltage to a remaining portion of the plurality of optical shutter segments during the remaining subportion of the first time interval comprises:

maintaining the predetermined portion of the plurality of optical shutter segments near zero volts during the remaining subportion of the first time interval.

16. A semiconductor device for driving a touchscreen having a plurality of optical shutter segments, the semiconductor device comprising:

a timing device for measuring a sensing time interval comprising a first portion and a remaining portion; and a capacitive sensor driver coupled to the timing device and providing a charging voltage to a capacitive sensing layer of the touchscreen during the first portion of the sensing time interval to charge the capacitive sensing layer; and a driver coupled to the timing device and providing a drive voltage at a first voltage level to the plurality of optical shutter segments during the first portion of the sensing time interval and maintaining the drive voltage at a second voltage level during the remaining portion of the sensing time interval, wherein the second voltage level is substantially zero volts, and wherein the first portion of the sensing time interval is less than half of the sensing time interval.

17. The semiconductor device of claim 16 further comprising a touchscreen input detector coupled to the timing device for determining a touchscreen input in response to sensing a charge of the capacitive sensing layer during the sensing time interval.

18. The semiconductor device of claim 16 wherein the first portion of the sensing time interval is approximately twenty percent of the sensing time interval.

19. The semiconductor device of claim 16 wherein the driver optically shutters the touchscreen by turning off a predetermined portion of the plurality of optical shutter segments and turning on the remaining portion of the plurality of optical shutter segments by providing the drive voltage to the predetermined portion of the plurality of optical shutter segments and an optical shutter backplane layer of the touchscreen and maintaining the remaining portion of the plurality of optical shutter segments near zero volts during a first subportion of the first portion of the sensing time interval and providing the drive voltage to the remaining portion of the plurality of optical shutter segments and maintaining the predetermined portion of the plurality of optical shutter segments and the optical shutter backplane layer near zero volts during a remaining subportion of the first portion of the sensing time interval.

* * * * *